United States Patent [19]

Kellow et al.

[11] 3,955,042
[45] May 4, 1976

[54] COOLING OF POWER CABLES BY A CLOSED-CYCLE EVAPORATION-CONDENSATION PROCESS

[75] Inventors: Mazin Kellow, Longueil; James Vansant, Chambly; Jacques Bonneville, St-Bruno, all of Canada

[73] Assignee: Hydro-Quebec Institute of Research, Darennen, Canada

[22] Filed: Sept. 30, 1974

[21] Appl. No.: 510,657

[52] U.S. Cl. .............................. 174/15 C; 165/45; 174/16 B
[51] Int. Cl.² ........................................ H01B 7/34
[58] Field of Search .............. 174/15 R, 15 C, 16 R, 174/16 B, 11 R; 62/316, 260; 165/45, 105

[56] References Cited
UNITED STATES PATENTS

| | | | |
|---|---|---|---|
| 1,754,314 | 4/1930 | Gay | 174/15 C |
| 3,363,046 | 1/1968 | Endacott | 174/15 C |
| 3,609,206 | 9/1971 | McConnell | 174/15 C |

FOREIGN PATENTS OR APPLICATIONS

| | | | |
|---|---|---|---|
| 594,242 | 5/1959 | Italy | 62/316 |
| 1,224,741 | 3/1971 | United Kingdom | 174/15 C |

*Primary Examiner*—Arthur T. Grimley
*Attorney, Agent, or Firm*—Raymond A. Robic; Peter G. Mack; Arthur Schwartz

[57] ABSTRACT

An apparatus for cooling underground power cables. Cooling of underground power cables is presently effected by the circulation of water or oil through pipes within which the cables are situated. The oil or water is then circulated through air or water-cooled heat exchangers which are uniformly spaced along the transmission line. However, a substantial flow of liquid is required to extract a useful quantity of heat, and extensive equipment is necessary to effect this flow of liquid. The subject invention proposes a relatively inexpensive and more efficient apparatus to cool underground cables. The apparatus comprises an enclosed chamber adapted to extend along a portion of a length of the underground cables and adapted to be partially filled with volatile liquid. An enclosed heat exchanger is connected to the enclosed chamber, the connection and the enclosed heat exchanger being located above a level of the volatile liquid within the enclosed chamber, whereby the volatile liquid is evaporated within the enclosed chamber by heat generated within the power cables. The evaporated liquid is transferred by virtue of a pressure differential from the enclosed chamber to the enclosed heat exchanger, wherein the evaporated volatile liquid is condensed and from which it flows by gravity back to the enclosed chamber.

6 Claims, 7 Drawing Figures

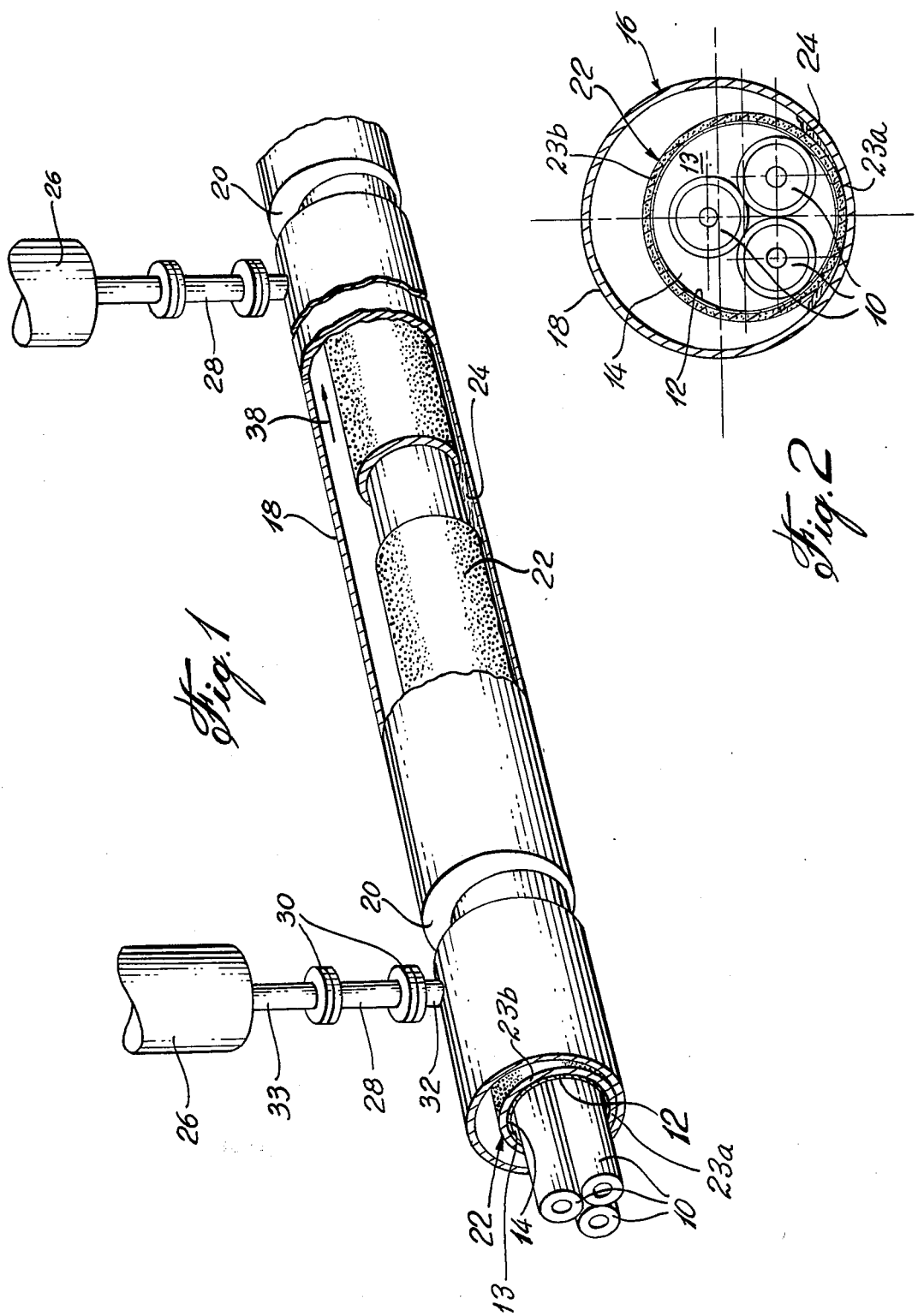

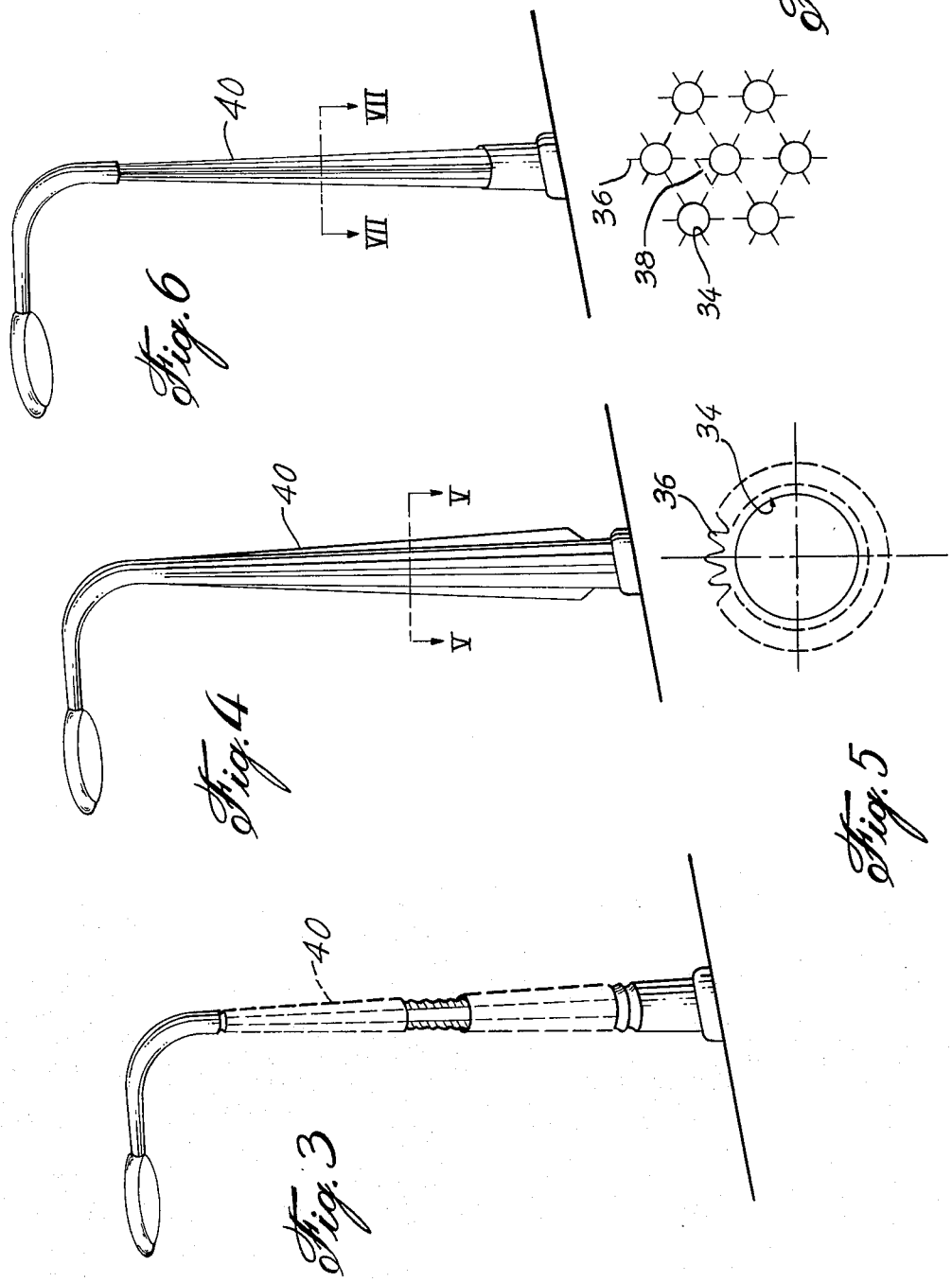

COOLING OF POWER CABLES BY A CLOSED-CYCLE EVAPORATION-CONDENSATION PROCESS

This invention relates generally to the cooling of underground power cables, and, in particular, to an apparatus utilizing a closed-cycle evaporation-condensation process by means of which heat is removed from such underground power cables.

In underground power cables, the electrical power transmission capability is limited by the maximum operating temperature of the cable. The temperature of the cable is directly related to the amount of heat generated by the cable and the ability of its surroundings to dissipate this heat. Regardless of the method of installation of the power cable, the surrounding soil has conventionally been relied upon for the dissipation of the heat energy generated by the power cable. However, the low thermal conductivity of the soil and the variation in conductivity with locale, weather conditions and moisture content of the soil generally require that a high safety factor be utilized in relation to the current ratings of underground power cables. Higher current ratings have been achieved by the use of special backfill materials having improved thermal conductivity and moisture retention. Nevertheless, even with the use of such materials, the heat dissipation capacity of the soil has almost reached its practical limit, while demands persist for underground power cables with increasing current ratings.

It is known that underground power cables can be cooled by the circulation of water or oil through pipes either buried adjacent to the length of the cables or through large diameter pipes within which the cables are situated. The oil or water is then circulated through air or water-cooled heat exchangers which are uniformly spaced along the transmission line. Refrigeration units have also been considered in conjunction with the heat exchanger for the cooling of the circulating fluid. The major deficiencies to such cooling processes are the substantial flow of fluid required to extract a useful quantity of heat and the extensive equipment and power machinery necessary to circulate and cool this flow. Moreover, with long cables, the circulating fluid rises progressively in temperature as it passes along the pipe, thereby becoming less effective as a cooling medium. These drawbacks are overcome by utilizing a closed-cycle evaporation-condensation process which provides effective means of heat removal. By the process, heat generated by the power cable evaporates a volatile liquid in the vicinity of the power cable. The vapour is condensed within a heat exchanger and the condensate returns by gravity to the vicinity of the power cable. No exterior source of power is reqired to effect completion of the evaporation-condensation process.

According to the present invention, the apparatus for cooling underground power cables with a volatile fluid comprises an elongated enclosed chamber and an elongated layer of porous material defining therewithin a space for receiving a power cable. The layer is disposed lengthwise within the enclosed chamber, and the layer has an upper portion and a lower portion, each of the portions running along the entire length of the layer. The lower portion is so disposed in the enclosed chamber as to contact a liquid phase of volatile fluid in the enclosed chamber. The upper portion of the layer is so disposed in the enclosed chamber as to be spaced from the liquid phase of volatile fluid. An enclosed heat exchanger is connected to the enclosed chamber at a connection point, the connection point and the enclosed heat exchanber being located above the liquid phase of volatile fluid within the enclosed chamber. Thus, uniform distribution of volatile fluid in the liquid phase over the surface of the porous layer is obtained by capillary action. The liquid is evaporated within the enclosed chamber by heat generated within the power cables, and the evaporated liquid is transferred by virture of a pressure differential from the enclosed chamber to the enclosed heat exchanger. The evaporated liquid is condensed in the heat exchanger, and it flows by gravity back to the enclosed chamber.

In drawings which illustrate embodiments of the subject invention:

FIG. 1 is a perspective view of the closed-cycle evaporation-condensation system, partially broken away to illustrate the interior construction of the evaporation section of the apparatus;

FIG. 2 is an enlarged vertical cross-section of the evaporation section of the embodiment of FIG. 1;

FIG. 3 is a schematic drawing in which the condensation section of the apparatus is incorporated in a lamp post;

FIG. 4 is a further embodiment of the lamp post condenser construction;

FIG. 5 is an enlarged horizontal section of the embodiment of FIG. 4, taken along the line V—V;

FIG. 6 is a further embodiment of the lamp post condenser construction;

FIG. 7 is an enlarged horizontal section of the embodiment of FIG. 6 taken along the line VII—VII.

While the preferred embodiment described below relates to a pipe-type transmission circuit, the subject invention is equally applicable to other types of underground power cable installations, such as individually sheathed cables.

As best illustrated in FIGS. 1 and 2, a high voltage transmission circuit of the high-pressure pipe-type installation comprises high-pressure oil-filled (HPOF) cables 10 situated in a longitudinal steel pipe 12, the space intermediate the cables 10 within the pipe 12 being occupied by oil 14 having a pressure of 200 psig. In order to simplify the description, cable joints and terminations have been omitted, although a similar type of cooling system can be adaped to these sections of the circuit. In electric circuits such as that illustrated in FIGS. 1 and 2, the oil 14 surrounding the cables 10 is oscillated between sub-stations in order to avoid the development of hot-spots along the cables. In addition, the oscillation of oil provides a measure of safety to the operation of the present systen, as will be discussed later.

The evaporator section of each apparatus comprises an enclosed chamber 16, shown in FIGS. 1 and 2 as being a pipe 18 having a circular cross-section which is slid onto the steel pipe 12. Each end of the circular pipe 18 has a circular plate 20 secured thereto by welding or other suitable means, the circular plates having openings through which the steel pipe 12 extends. Each end plate 20 is secured in place on the steel pipe 12 by welding or other suitable means so as to provide a sealed enclosure between the steel pipe 12 and the interior of the circular pipe 18.

Prior to securing the end plates 20 to the steel pipe 12 and circular pipe 18, the portion of the steel pipe 12 to be situated within the enclosed chamber 16 is covered about its outer surface with a layer of porous material 22. The layer of porous material 22 defines therewithin a space 13 for receiving a power cable and associated elements. In the present embodiment, of course, space 13 is occupied by pipe 18, cables 10, and oil 14. The layer of porous material 22 has a lower portion 23a contacting the volatile liquid 24 and an upper portion 23b, which portions together effect uniform distribution of volatile liquid 24 situated in the bottom of the enclosed chamber 16 over the heat transfer surface of the steel pipe 12, thereby avoiding the necessity of otherwise flooding the enclosed chamber 16. The porous material utilized has a high capillary pumping capacity for the particular volatile liquid being utilized, as well as being chemically compatible with the volatile liquid and the retaining pipes. One such suitable porous layer comprises untreated fibreglass which is chemically inert while its capillarity can be varied, depending on the closeness of the weave and thickness of the porous layer. Other woven fabrics and metallic meshes may also be utilized.

The condenser section of the apparatus comprises an enclosed heat exchanger 26 which is connected to one end of the enclosed chamber 16 at a connection point by means of a suitable connector, such as flexible coupling 28 in FIG. 1. The flexible coupling 28 has flanged ends 30, the lower flanged end being releasably attached to a flanged adapter 32 which is rigidly secured to the top portion of the enclosed chamber 16. The upper flanged end 30 of the flexible coupling 28 engages a further flanged adapter 33 mounted on the lower end of the enclosed heat exchanger 26. The enclosed heat exchanger 26 is positioned vertically above the enclosed chamber 16, thus allowing condensed volatile liquid within exchanger 26 to return by gravity to the enclosed chamber. The enclosed chamber 16 may be inclined downwardly away from the enclosed heat exchanger 26 in order to facilitate flow of the volatile liquid 24 toward the end of the enclosed chamber 16 remote from the enclosed heat exchanger 26. In addition, the enclosed heat exchanger 26 is generally positioned above ground level to increase heat dissipation therefrom.

As best illustrated in FIGS. 3 to 7, the enclosed heat exchanger may be incorporated in a lamp post 40, but is not necessarily restricted thereto. The size and shape of the enclosed heat exchanger 26 will vary according to its location. The lamp post-type condenser construction is utilized in conjunction with major underground arteries supplying large cities and connecting sub-stations which normally run adjacent to highways and main roads. As best illustrated in FIGS. 5 an 7, condensation occurs at the inner surface or surfaces 34 of the lamp post construction, while the outer surface or surfaces include fins 36 which expose an increased heat transfer area to the atmosphere. The lamp post of FIG. 7 may further include an outer surface passageway 38 to house the electric leads for the lamp. Depending on the relative position of the lamp post-type condenser to the circuit length, its connection to the enclosed chamber 16 may be by means of either a solid or flexible pipe connection of any reasonable length so long as there is no barrier to the vapor and condensate flow.

The volatile liquid 24 utilized should meet the following requirements:

a. It should be chemically compatible with the walls of the enclosed chamber 16 and enclosed heat exchanger 26, as well as with the layer of porous material 22;

b. It should have a vapor pressure less than 180 psig. at a maximum operating temperature of approximtely 60°C.;

c. It should have a high latent heat of vaporization, as well as high vapor density and surface tension. The following liquids meet the above requirements to varying degrees: ammonia, propane, fluorocarbon refrigerants, and water. Those liquids which allow the system to operate at pressures exceeding atmospheric pressure have the added advantage of permittng continuous operation of the system after a small leak develops until all the volatile liquid 24 leaks out in the form of vapor. Operating pressures less than 200 psig avoid contamination of the oil 14 should a leak occur in the steel pipe 12.

A pressure sensor may be installed in conjunction with each evaporation-condensation process apparatus, which is connected to the nearest sub-station to detect the performance and possible failure of each unit. The flow of oil 14 within the steel pipe 12 aids in the dissipation of heat generated along the length of the power cable during the time that the evaporation-condensation apparatus is being repaired.

The operation of the evaporation-condensation apparatus is based on the evaporation of the voltile liquid 24 in the vicinity of the power cable enclosure 12 due to the heat generated thereby. By means of capillary action, volatile liquid 24 in the bottom of the enclosed chamber 16 and contacting lower portion 23a of the layer of porous material 22 is drawn into portion 23a of the layer 23a of porous material 22 surrounding the power cable enclosure 12. The vapor generated flows along the enclosed chamber 16 in the direction of the arrow 38 in FIG. 1, and then through adapter 32, flexible coupling 28, and adapter 33, into the enclosed heat exchanger 26. The flow of vapor in the direction indicated is induced by a slight pressure differential existing between the enclosed heat exchanger 26 and the enclosed chamber 16 resulting from the lower temperature within the enclosed heat exchanger 26. Within the enclosed heat exchanger 26, the vapor condenses by releasing its heat content to the cooling medium, which may be circulating ambient air or cooling water. The resulting condensate then flows, by gravity, back to the enclosed chamber 16, thus completing the cycle. The complete working cycle is then achieved without the utilization of pumps or other power machinery.

The evaporator and condenser sections are built as a closed system containing the volatile liquid in equilibrium with its vapor. Since liquids evaporate and condense at the same temperature, the two sections of the system will maintain almost equal temperatures. Also, the transfer process is at nearly constant volume, resulting in interdependence between the temperature and pressure. Consequently, the system will operate at any temperature above the freezing point of the liquid. Generally, more effective cooling can be achieved with increasing operating temperatures. However, this phenomenon reverses as the critical temperature is approached. The cooling system, as such, effects large heat transfer rates for long circuit lengths while requiring little temperature differential. Also, responses to thermal transients are short due to the relatively small mass involved. The soil can still be relied upon to dissipate some of the generated heat, its large heat storage capability serving to even out daily fluctuations in cable temperature caused by uneven loads.

We claim:

1. An apparatus for cooling underground power cables with a volatile fluid comprising: an elongated enclosed chamber; an enlongated layer of porous material defining therewithin a space for receiving a power cable, said layer being disposed lengthwise within said enclosed chamber, said layer having an upper portion and a lower portion, each of said portions running along the entire length of said layer, said lower portion being so disposed in said enclosed chamber as to contact a liquid phase of volatile fluid in said enclosed chamber, said upper portin being so disposed in said enclosed chamber as to be spaced from the liquid phase of volatile fluid; an enclosed heat exchanger connected to the enclosed chamber at a connection point, said connection point and said enclosed heat exchanger being located above the liquid phase of volatile fluid within the enclosed chamber, whereby uniform distribution of the volatile fluid in the liquid phase over the surface of the porous layer by capillary action is obtained, whereby the liquid is evaporated within the enclosed chamber by heat generated within the power cables, whereby the evaporated liquid is transferred by virtue of a pressure differential from the enclosed chamber to the enclosed heat exchanber, and whereby the evaporated liquid is condensed in the heat exchanger, and flows by gravity back to the enclosed chamber.

2. An apparatus for cooling underground power cables according to claim 1, wherein the enclosed heat exchanger is connected to one end of the enclosed chamber and extends upwardly therefrom, the enclosed chamber being sloped downwardly away from the enclosed heat exchanger, whereby distribution of condensed volatile liquid along a length of the enclosed chamber by gravity flow is obtained.

3. An apparatus for cooling underground power cables according to claim 1, wherein the enclosed heat exchanger is located above ground level, and is incorporated in the construction of a lamp post.

4. An apparatus for cooling underground power cables according to claim 1, wherein the porous material comprises untreated fibreglass.

5. An apparatus for cooling underground power cables according to claim 1 wherein the volatile liquid is selected from the group consisting of ammonia, propane, fluorocarbon refrigerants, and water.

6. An apparatus for cooling underground power cables according to claim 1, including a flexible coupling at said connection point beween the enclosed chamber and the enclosed heat exchanger.

* * * * *

Disclaimer

3,955,042.—*Mazin Kellow*, Longueil, *James Vansant*, Chambly, and *Jacques Bonneville*, St-Bruno, Quebec, Canada. COOLING OF POWER CABLES BY A CLOSED-CYCLE EVAPORATION-CONDENSATION PROCESS. Patent dated May 4, 1976. Disclaimer filed May 17, 1976, by the assignee, *Institut de Recherche de l'Hydro-Quebec (IREQ)*.

The term of this patent subsequent to Mar. 23, 1976, has been disclaimed.
*[Official Gazette July 20, 1976.]*